June 18, 1957   H. V. BOGGESS ET AL   2,795,798
WATER CLOSET BOWL SUPPORT AND DRAIN ASSEMBLY
Filed Sept. 27, 1951   6 Sheets-Sheet 3

INVENTORS
HURLEY V. BOGGESS
JOHN H. SCHMID
BY

June 18, 1957   H. V. BOGGESS ET AL   2,795,798
WATER CLOSET BOWL SUPPORT AND DRAIN ASSEMBLY
Filed Sept. 27, 1951   6 Sheets-Sheet 5

INVENTORS
HURLEY V. BOGGESS
JOHN H. SCHMID

Florian G. Miller
ATTORNEY

United States Patent Office 2,795,798
Patented June 18, 1957

2,795,798

WATER CLOSET BOWL SUPPORT AND DRAIN ASSEMBLY

Hurley V. Boggess, Mercer Island, Wash., and John H. Schmid, Erie, Pa., assignors to J. A. Zurn Mfg. Co., Erie, Pa., a corporation of Pennsylvania Application September 27, 1951, Serial No. 248,622

7 Claims. (Cl. 4—211)

Our invention relates generally to plumbing fittings for carrying wall fixtures and more particularly to adjustable wall closet fittings combined with face plates for carrying a wall closet and draining same.

The accurate positioning of wall water closets and other wall fixtures has long been a problem in the large scale installation thereof in battery. The four, five, and six inch cast iron sewer pipe used in installing batteries of wall closet fixtures are difficult to handle and they can only be positioned within very wide tolerances. The relative positioning vertically of water closet bowls and drain pipe connections may vary an inch or more if the installation is to be accomplished with an economical use of labor. If water closet bowls in horizontal banks are to be installed, the drain pipe should form a slight angle and should be inclined to the horizontal for proper drainage in which event the relative vertical positioning of water closet bowls and the drain pipe will of necessity be different from one end of the bank to the other.

It has heretofore been necessary for manufacturers to provide many different types of wall closet fittings inasmuch as a particular type of fitting was necessary for each job. Right and left hand wall closet fittings are required for banks of water closets which are horizontally connected and other types of wall closet fittings, are required for vertically connected closets, each fitting being suitable only for the particular installation. It is now necessary to warehouse a large number of wall closet fittings in any particular area to fit different jobs.

Our combined wall closet fitting and face plate includes a combination drain and vent fitting which can be used for either horizontal or vertical draining and an adjustable face or carrier plate which is adjustably secured to the fitting in different rotative and vertical positions for carrying a wall closet or other wall fixture. The face or carrier plate is adapted for use with either three or four bolt water closet bowls. Siphon jet water closets take four bolts and the coupling is disposed centrally of the face or carrier plate. A blow-out closet takes three bolts for supporting same and the coupling connections to the fitting are comparatively high. Our combined wall closet fitting and carrier plate is adapted to accommodate a blow-out water closet or one of the siphon jet type. The fitting may be disposed in vertical batteries or in horizontal batteries and it may be disposed vertically and also horizontally to take the place of a left hand fitting.

It is, accordingly, an object of our invention to overcome the above and other defects in present wall closet fittings and carriers and it is more particularly an object of our invention to provide a combined adjustable wall closet fitting and carrier which is simple in construction, economical in cost, economical in manufacture, and easy to install.

Another object of our invention is to provide a wall closet fitting and carrier with permissible adjustments whereby it may be used in either a horizontal or a vertical battery of wall closets.

Another object of our invention is to provide a wall closet fitting and carrier which will allow for adjustable vertical positioning of a wall closet while the drain fitting is in either a horizontal or a vertical position.

Another object of our invention is to provide a novel carrier plate for use with our novel plumbing fitting which is adapted to accommodate closet bowls having three or four apertures for receiving three or four supporting bolts.

Another object of our invention is to provide a combined wall closet fitting and carrier adapted to carry different types of water closet bowls and also adapted to fit into various types of installations to minimize dealer inventories and to standardize production, thereby reducing cost of manufacturing.

Another object of our invention is to provide an adjustable carrier plate for use in combination with our novel wall closet fitting which is reversible to accommodate three or four bolts for supporting different types of water closet bowls, and which has means on opposite sides thereof for securing a supporting foot thereto.

Other objects of our invention will become evident from the following detailed description, taken in conjunction with the accompanying drawings, in which.

Figures 3, 4, 5, 6:
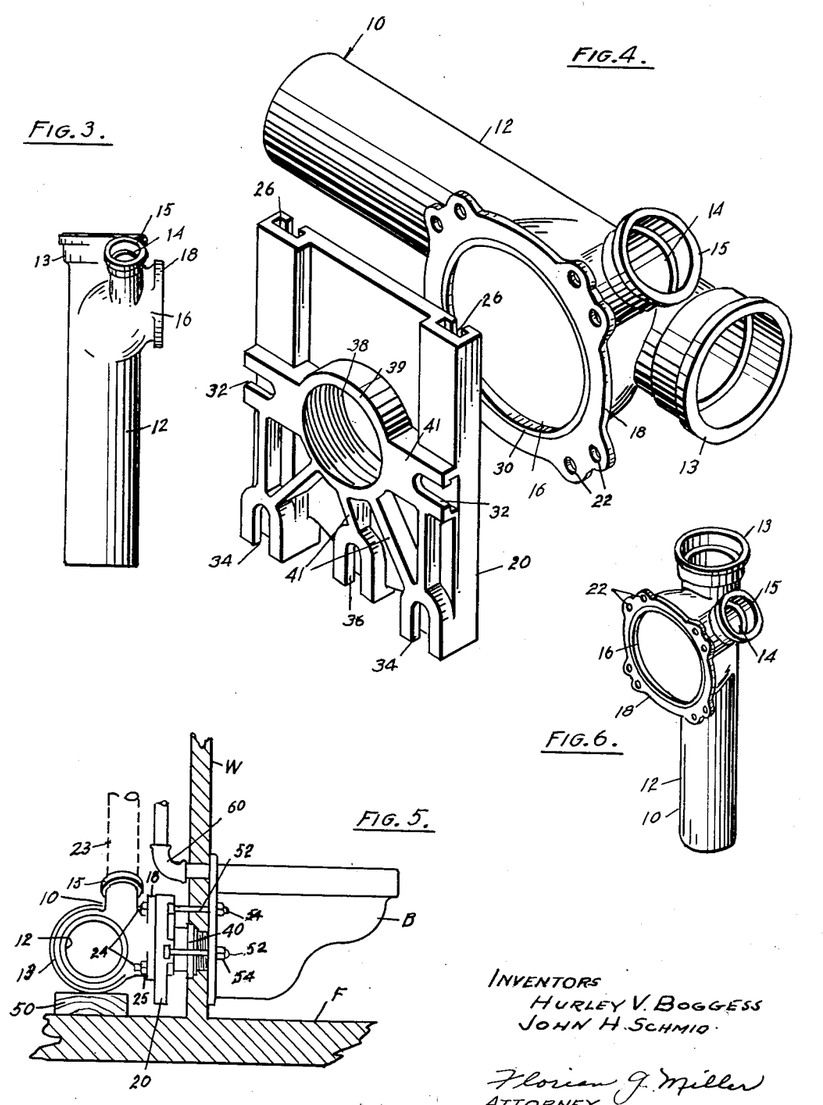
Fig. 3 is a side elevational view of our wall closet fitting shown in Fig. 1.
Fig. 4 is an exploded perspective view of our novel wall closet fitting and carrier plate positioned for use with horizontal drain piping and for supporting a three bolt blow-out type wall closet.
Fig. 5 is a side elevational view of our novel wall closet fitting and carrier in an installation in which the drain piping is horizontal and in which a four bolt closet bowl is supported with the drain fitting and carrier concealed in a wall.
Fig. 6 is a perspective view of a modified form of our wall closet fitting in which the vent pipe joins the drain member on the opposite side from that shown in Fig. 1 so that it may be used as a left hand horizontal fitting.

Referring now to the drawings, Figs. 1 to 5 inclusive show a wall closet fitting 10 consisting of a cylindrical portion 12 with an enlarged branch 16. A vent branch 14 extends radially outwardly from the branch 16 and is offset angularly from a vertical plane through the central axis of the branch 16 and is disposed substantially midway between the central axis of the cylindrical member and the opening. The cylindrical portion 12 and the vent branch 14 are formed with bells 13 and 15, respectively, for conventional leaded connections; however, threaded connections may also be provided instead of the bells 13 and 15. The cylindrical portion 12 of the fitting 10 is connected to drain pipes 17 and 19 and the vent branch 14 is connected to a vent conduit 21 which extends upwardly at 23 by conventional means. This is a typical installation when water closets are installed in a vertical bank with the drain pipes running vertically. The branch 16 of the fitting 10 has an outwardly directed marginal flange 18 and the inner sides thereof are inclined in a direction to direct drainage water into the cylindrical portion 12 of the fitting 10, as best shown in Fig. 3, while the face of the flange 18 is parallel to the axis of the cylindrical portion 12. The axis of the vent branch 14 lies at about a forty-five degree angle from a vertical plane passing through the axis of the branch 16 of the fitting 10. Better venting is provided by having the vent pipes slope away from the egress end of the cylindrical portion 12 of the fitting 10.

The flange 18 has circumferentially spaced apertures 22. We show four sets of two apertures each equally spaced around the circumference of the flange 18 which we have found to be desirable for simplicity of construction; however, a more or less number of apertures may be used without departing from our invention. We show two apertures 22 in each quadrant but four arcuate slots (not shown) would serve equally well.

The axis of the cylindrical portion 12 of the fitting 10 should be offset from the axis of the branch 16 away from the side from which the vent branch 14 extends. This insures proper venting and draining in both the horizontal and vertical type of installation and is best shown in Fig. 5.

Figures 1, 2:
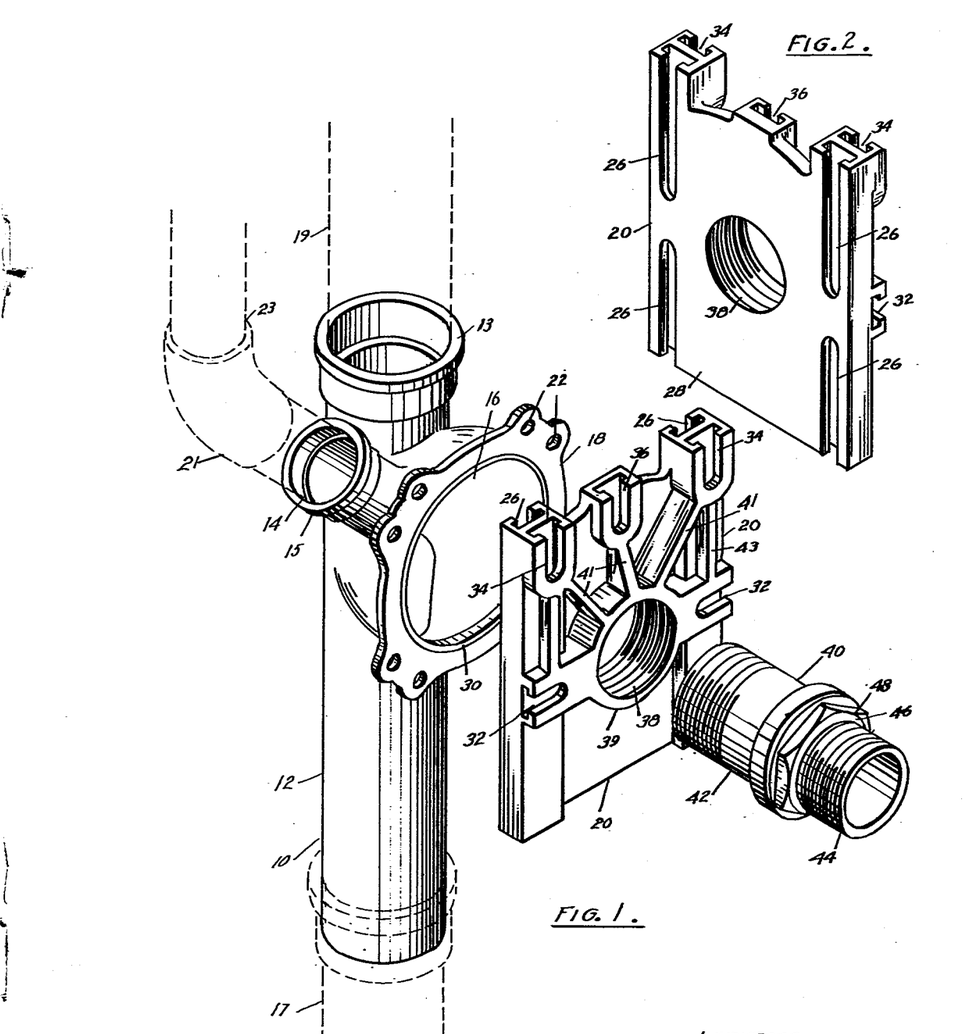
Fig. 1 is an exploded perspective view of an illustrative embodiment of our invention used in conjunction with vertical drain piping and positioned to accommodate a four bolt siphon jet type water closet, the connecting drain and vent pipes being shown in dotted lines.
Fig. 2 is a perspective view of our novel carrier plate from the back side thereof.

Water closets may be vertically spaced at predetermined vertical distances from each other to conform to various floors of a building in the position shown in Fig. 1 or the water closets may be grouped horizontally on the same floor with the fitting 10 disposed substantially horizontal as shown in Fig. 5. This differs from prior devices wherein a different type fitting must be provided for horizontal and vertical batteries. The vent branch 14 of the fitting 10 may extend angularly in a direction opposite to that shown in Fig. 1 as shown in Fig. 6 in which the parts are reversed to provide both right and left hand fittings.

In Figs. 1, 2, 4, and 5, we show a novel carrier plate 20 which is adjustably secured to the fitting 10 by means of four bolts 24 shown in Fig. 5. The heads of the bolts 24 are inserted into the T-slots 26 in the back of the carrier plate 20 and the shanks thereof are then inserted into the four laterally outermost apertures 22. Nuts 25 threadably engage the bolts 24 to secure the plate 20 onto the flange 18. When the carrier plate 20 is secured in the desired position, the smooth back face 28 thereof is seated against sealing ring 30 which is disposed in an annular groove at the entrance to the branch 16, thus providing a water tight seal at this point.

The slots 26 extend from the four corners of carrier plate 20 parallel to each other along the edges of the smooth back face of the plate 20 to a point near the middle of the plate 20. The outlet of a water closet bowl such as B in Fig. 5 may not always be at the same vertical position relative to the branch 16. The various relative positions of the outlet of a water closet bowl and the branch 16 may be taken care of by the movement of the bolts 24 along the extent of the T-slots 26. Center discharge opening 38 in the carrier plate 20 is threaded. It does not have to be axially aligned with the center of the branch 16 of the fitting 10 because of the large diameter of the branch 16.

On the front face of the carrier plate 20, relatively short, parallel, laterally spaced T-slots 34 and 36 and laterally extending slots 32 are formed in projections on the plate 20. Slots 32 extend inwardly from the middle of opposite sides of the plate 20. Slots 32 and 34 are used for supporting a siphon jet type water closet which requires four bolts with the carrier plate 20 in the position shown in Fig. 1. The blow-out type water closet requires only three bolts for hanging so slots 32 and slot 36 extending inwardly from the middle of one end of the plate 20 between slots 34 are used on this type of support. The carrier plate 20 is inverted to the position shown in Fig. 3 in supporting a blow-out type water closet.

The carrier plate 20 has an annular flange 39 around the central opening 38 and ribs 41 extending radially of the flange 39, and ribs 43 extending parallel to the slots 26 on the opposite side of the carrier plate 20.

The drainage opening 38 in the carrier plate 20 is threaded to receive a threaded coupling 40 which sealingly engages the back side of a water closet. The coupling 40 is adjustable axially thereof for adjustable spacing of a water closet relative to the face of the carrier plate 20 by a threaded pipe 44 being externally threaded to threadably engage the internal threads of pipe 42. Lock nut 46 and gasket 48 are provided for locking and sealing the pipes 42 and 44.

We show in Fig. 5 a typical installation in which our wall closet fitting and carrier is disposed on the opposite side of the wall W to the water closet B and supported on the floor F. Shoring 50 under the fitting 10 supports the assembly. Water closet bowl B is secured to carrier plate 20 by bolts 52. The water closet bowl B is of the siphon jet type requiring four bolts 52 for its support. With four bolts being used, two have their heads positioned in slots 32 and two in slots 34, the shanks running through openings in bowl B and being secured by nuts 54. The pipe 44 of the coupling 40 abuts the drain outlet opening in bowl B. A water supply conduit for bowl B is shown at 60.

From the foregoing description, it will be evident that we have provided a water closet bowl and drain assembly with a multi-purpose drain and vent member and a multi-purpose carrier plate which lends itself to economical manufacture, smaller dealer inventories, simple installation, economical cost, adjustment for accommodating different types of installation, and one which is efficient in operation.

Figures 7, 8, 9:
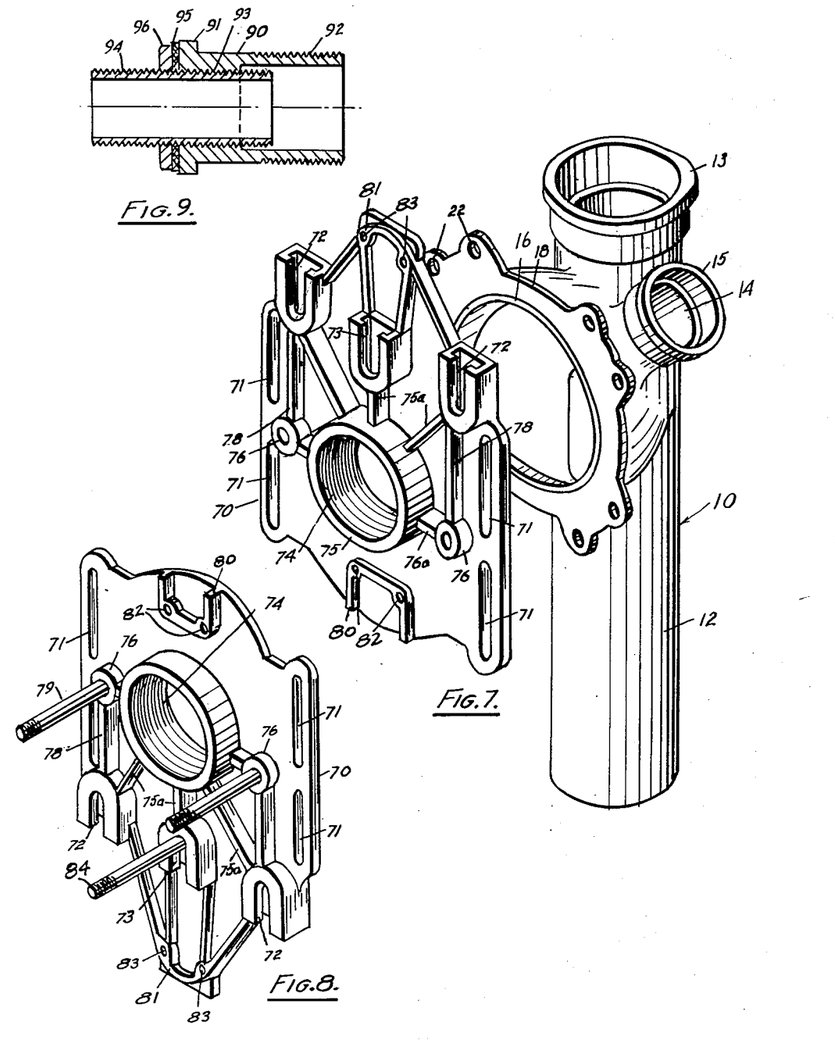
Fig. 7 is a perspective view of our novel wall closet fitting with a modified form of carrier plate, the fitting being disposed for connection to vertical piping and the carrier plate being positioned for carrying a four bolt water closet bowl.
Fig. 8 is a perspective view of the carrier shown in Fig. 7 in an upside down position for accommodating a three bolt blow-out type water closet.
Fig. 9 is a vertical sectional view of a coupling member for use in conjunction with our novel combined wall closet fitting and carrier plate.

In Figs. 7, 8, and 9, we have shown a modified form of carrier plate 70 wherein T-slots 26 have been eliminated and longitudinally extending slots 71 have been provided to perform the same function. Slots 72 and 73 are formed in projections and positioned on the plate 70 with reference to the central, internally threaded drain opening 74 the same as the slots 34 and 36 and the drain opening 38 in face plate 20. An annular flange 75 and ribs 75a are positioned the same as flange 39 and ribs 41 in Fig. 1. Face plate 70 has outwardly extending, centrally apertured, internally threaded bosses 76 connected to the flange 75 by ribs 76a and to the projections having slots 72 by ribs 78. The bosses 76 threadably engage the ends of supporting studs 79. The supporting plate 70 has projections 80 and 81 on opposite sides of the central opening 74, the projections having laterally spaced, threaded apertures 82 and 83, respectively, for receiving screw bolts to attach supporting feet thereto selectively, the supporting feet resting on the floor to support the carrier plate 70 and the water closet hung thereon. The T-slot 73 receives the T-head of a supporting screw bolt 84, the studs 79 and bolt 84 providing support for a blow-out type of water closet.

It will thus be seen that the face plate 70 requires much less metal than the face plate shown in Figs. 1 to 5 inclusive by eliminating most of the T-slots and substituting merely longitudinally extending slots 71 therefor. It also makes the casting thereof much more simple. The fitting 10 is the same as the fitting heretofore described in Fig. 6.

When the face plate is in a position as shown in Fig. 7, the shanks of bolts (not shown) extend through the slots 71 and through the outermost apertures 22 in the flange 18 on the fitting 10 to connect the face plate 70 to the flange 18. Supporting studs 79 then threadably engage the threaded bosses 76 and T-shaped heads of bolts such as bolt 84 engage the T-slots 72 to provide a four bolt support for a siphon jet type water closet. Supporting feet (not shown) are connected to the projecting portion 80 by screw bolts threadably engaging the threaded apertures 82 therein. Upon reversing the supporting plate 70 as shown in Fig. 8, supporting studs 79 threadably engage the threaded bosses 76 and the T-shaped head engages the T-shaped slot 73 in the face plate 70 to provide a three bolt support for a blow-out type water closet. With the plate 70 in this position, the supporting feet are connected to the projection 81 by screw bolts threadably engaging the threaded apertures 83 therein.

In Fig. 9, we show a slightly different type of coupling wherein the pipe member 90 has an outwardly directed flange 91 on one end thereof and is externally threaded at 92 on the other end thereof for threadably engaging the opening 74 in the face plate 70. The pipe member 90 is also internally threaded at 93 for threadably engaging an externally threaded pipe member. A pipe member 94 is locked in position by means of an annular gasket 95 and a lock nut 96 forcing it against the end of the flanged end 91 of the pipe 90 and into the outer threads of the member 94. The function of this coupling is substantially the same as the coupling shown in Fig. 1.

Figure 10:
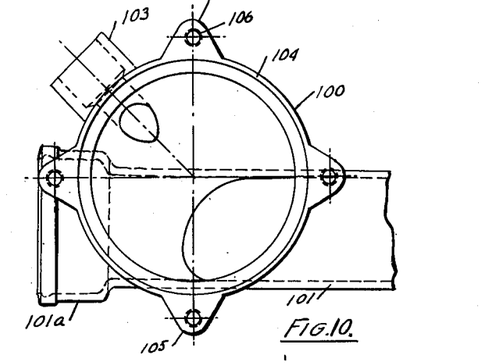
Fig. 10 is a side elevational view of another modified form of our novel fitting.
Figure 11:
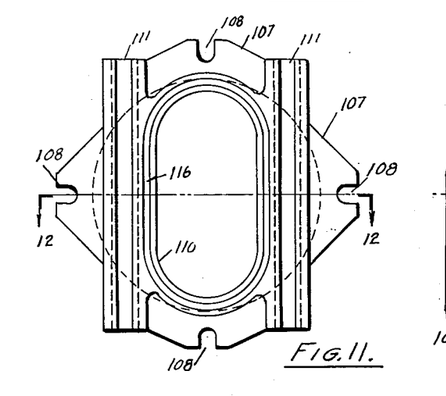
Fig. 11 is a side elevational view of an adapter for disposal on the fitting shown in Fig. 10.
Figure 12:
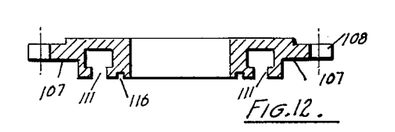
Fig. 12 is a view taken on the line 12—12 of Fig. 11.
Figures 13, 14:
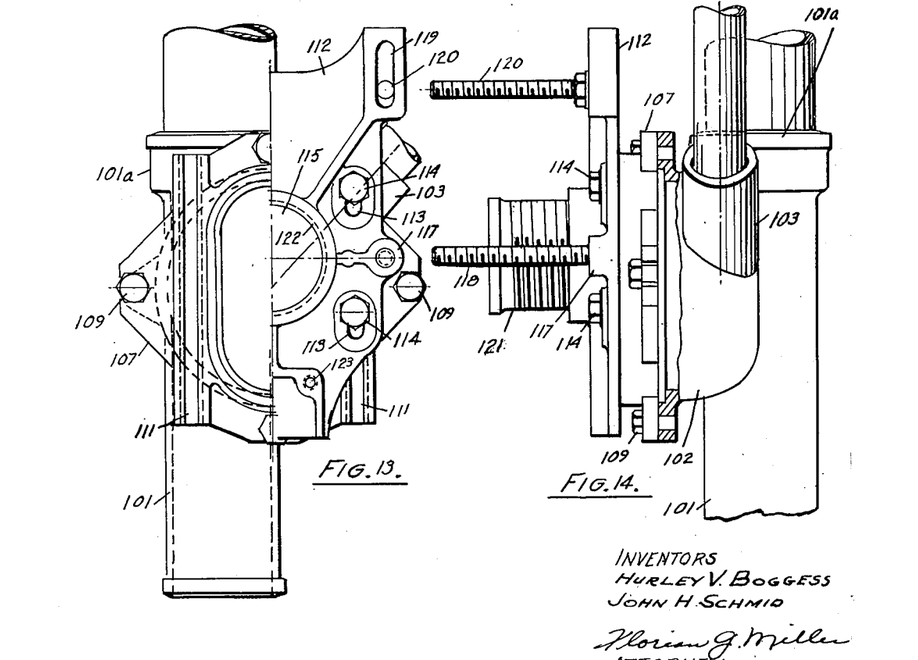
Fig. 13 is a side elevational view with one side thereof broken away for better illustration showing the fitting and adapter in Figs. 10 and 11 with a carrier plate attached thereto.
Fig. 14 is a side elevational view of the combined fitting, adapter, and carrier plate shown in Fig. 13.

Another modified form of our invention is shown in Figs. 10 to 14 inclusive of the drawings. The fitting 100 comprises a cylindrical member 101 having a bell end 101a and a spigot end. The member 101 has a laterally extending, enlarged branch 102 with a vent 103 extending outwardly therefrom at forty-five degrees. The branch 102 has a face portion 104 with circumferentially spaced, outwardly extending ears 105 with threaded apertures 106. The fitting 100 is shown in a horizontal position in Fig. 10 and in a vertical position in Fig. 14. An adaptor 107 as shown in Fig. 11 has circumferentially spaced recesses 108 corresponding to the apertures 106 in the ears 105 of the face 104 of the fitting 100, an elongated aperture 110, and parallel slots 111. Screw bolts 109 threadably engage the threaded apertures 106 and extend through the recesses 108 to secure the adapter 107 onto the face 104 of the branch 102 of the fitting 100 with the parallel slots 111 and elongated aperture 110 in the adapter 107 in a vertical or a horizontal position with reference to the cylindrical member 101 as desired. Figs. 13 and 14 show the T-slots 111 and aperture 110 in a vertical position parallel to the axis of the cylindrical member 101. A face or carrier plate 112 has spaced elongated slots 113 complementary to the slots 111 in the adapter 107 through which extend bolt 114 having the end portions thereof anchored in the T-slots 111 in the adapter 107 to secure the face or carrier plate 112 onto the adapter 107. The slots 113 are elongated to provide vertical adjustment of the carrier plate 112 relative to the adapter 107. The carrier plate 112 has a centrally disposed, internally threaded aperture 115 for alignment with the elongated aperture 110 in the adapter 107. A coupling as shown in Fig. 9 is threadably engagable with the threaded aperture 115 in the carrier plate 112. A suitable packing (not shown) is disposed in the groove 116 surrounding the elongated aperture 110 in the adapter 107 to seal the aperture 110. The carrier plate 112 has laterally spaced, threaded bosses 117 for receiving threaded supporting studs 118 for a water closet. The carrier plate 112 also has elongated slots 119 spaced laterally on the upper side thereof for receiving supporting bolts 120 for supporting a water closet as shown in Figs. 13 and 14. A coupling member 121 is shown threadably engaged with the threaded portion 122 of the central aperture 115 of the carrier plate 112. It will thus be seen that the fitting 100 may be disposed in a vertical bank as shown in Fig. 14 or horizontally as shown in Fig. 10. The adapter member 107 is connectible to the face 104 of the fitting 100 with the elongated aperture 110 and the slots 111 parallel with or at right angles to the cylindrical member 101 of the fitting 100. The carrier plate 112 is vertically adjustable on the adapter 107 so that adjustment in any direction is obtained with this modification of our novel fitting and carrier plate. The carrier plate 112 has threaded apertures 123 for securing feet to the carrier 112 for support thereof if desired.

Figure 15:
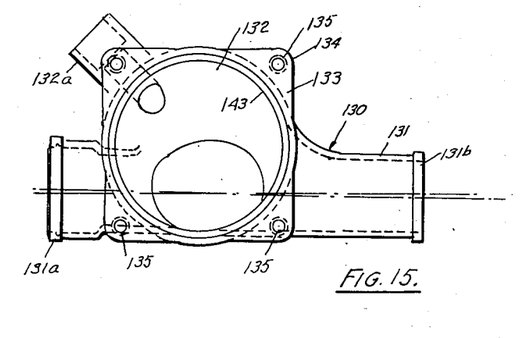
Fig. 15 is a side elevational view of another modified form of our novel fitting.
Figure 16:
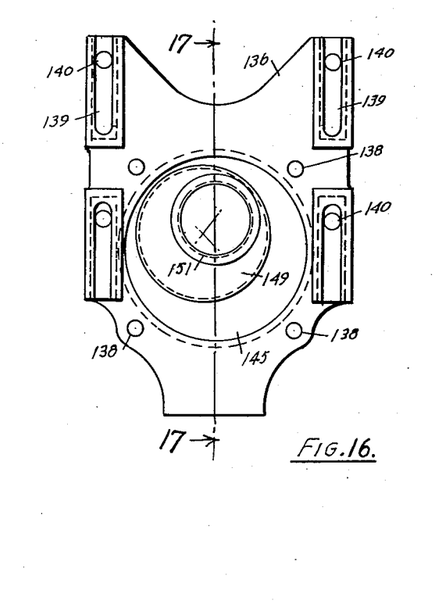
Fig. 16 is a side elevational view of another form of carrier plate for use with the fitting of Fig. 15.
Figure 17:
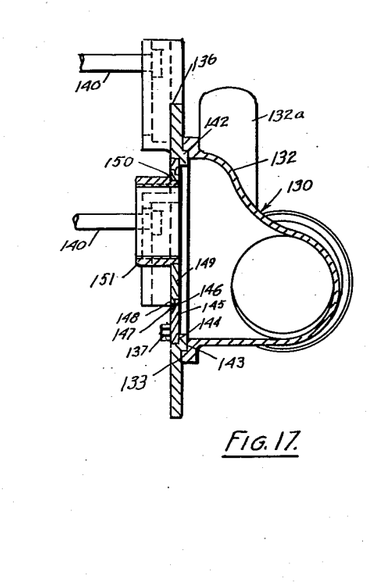
Fig. 17 is a section taken along line 17—17 of Fig. 16, with the fitting of Fig. 15 attached thereto.

Figs. 15, 16, and 17 show another modification of our novel fitting and carrier plate. We show in Fig. 15 a fitting 130 comprising a cylindrical member 131 having a bell end 131a and a spigot end 131b for connection to conventional piping. The member 131 has an enlarged, laterally extending branch 132 with a face 133 with outwardly extending ears 134 having threaded apertures 135 therein. The ears 134 and apertures 135 are spaced ninety degrees from each other around the face 133 of the fitting 130. The branch 132 has a vent 132a extending upwardly therefrom. A face or carrier plate 136 is attached to the face 133 of the branch 132 of the fitting 130 by screw bolts 137 extending through apertures 138 in the plate 136 and threadably engaging the threaded apertures 135 in the ears 134 in the face 133 of the branch 132 of the fitting 130. The carrier plate 136 has parallel T-slots 139 on opposite sides thereof for anchoring supporting bolts 140 for a water closet. The carrier plate 136 has an inwardly extending, annular projection 142 for engaging a peripheral groove 143 in the face 133 of the fitting 130 as shown in Fig. 17. The face plate 136 has an annular groove 144 for nesting a circular plate 145 with an eccentrically disposed aperture 146 therein. The periphery of the eccentrically disposed aperture 146 has a peripheral groove 147 for seating an offset marginal portion 148 of a circular plate 149 having an internally threaded, eccentrically disposed aperture 150 therein. A threaded coupling member 151 is shown threadably engaged with the threaded aperture 150 in the plate 149. It will be evident that the carrier plate 136 may be disposed in a vertical or a horizontal position with reference to the cylindrical member 131 and the plates 145 and 149 may be rotated relative to each other so as to place the coupling 151 in any desired position with relation to the branch opening 132 in the fitting 130. The plate 145 is attached to the marginal groove 144 of the plate 136 and the plate 149 is attached to the marginal groove 147 of the plate 145 by conventional welding or soldering methods after they have been moved and adjusted to the desired position.

Figures 18, 19:
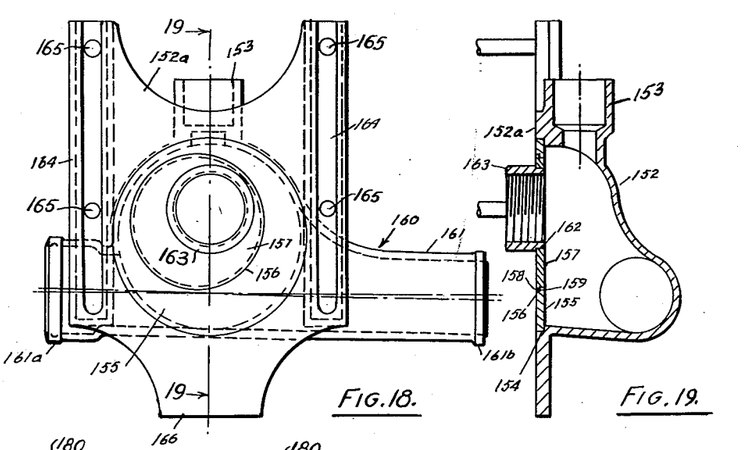
Fig. 18 is a side elevational view of an integral fitting and carrier plate in another modified version of our invention.
Fig. 19 is a view taken on the line 19—19 of Fig. 18.
Figure 20:
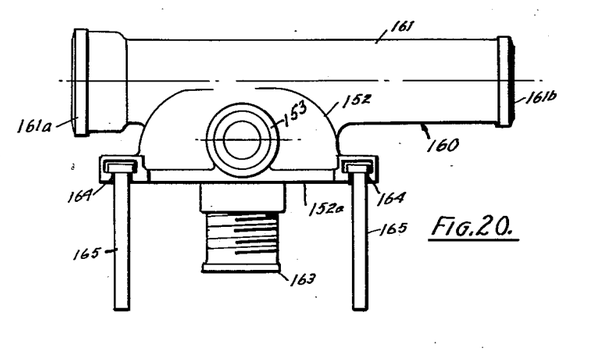
Fig. 20 is a plan view of the integral fitting and carrier plate shown in Fig. 18.

In Figs. 18, 19, and 20, we show a fitting and carrier for a water closet similar to the fitting and carrier plate shown in Figs. 15 to 17 inclusive except that the carrier plate is integral with the fitting. In Figs. 18, 19 and 20, we show a fitting 160 having a longitudinally extending tubular member 161 with a bell end 161a and a spigot end 161b for connection to conventional piping. The member 161 has a laterally extending branch 152 with a vent 153 in the upper part thereof. The branch 152 has a face 152a with a peripheral groove 154 for nesting a circular plate 155 with an eccentrically disposed aperture 156. A second circular plate 157 has an offset peripheral portion 158 for seating in the grooved portion 159 of the aperture 156 in the plate 155, the plate 157 having an eccentrically disposed aperture 162 for receiving an internally threaded coupling 163. The face 152a of the fitting 160 has laterally spaced, parallel slots 164 along the sides thereof for receiving the anchoring heads of supporting bolts 165 for supporting a water closet. The fitting 160 has an apron or leg 166 for the support thereof on a floor. In this modification of our invention, the plates 155 and 157 are rotated relative to each other until the aperture 162 in the plate 157 is disposed in the desired position with relation to the opening in a water closet supported by the bolts 165. The plates 155 and 157 are secured together at the margins thereof and to the face 152a of the fitting 160 by any suitable welding or soldering method.

Figure 21:
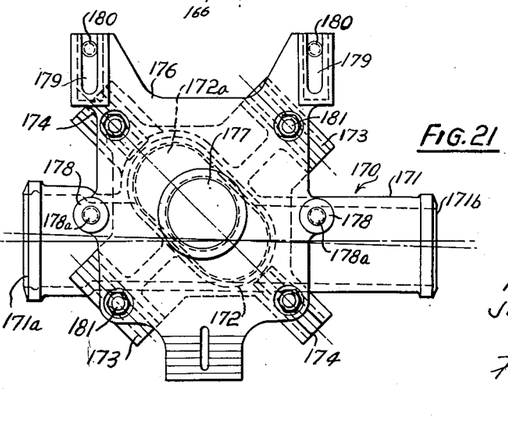
Fig. 21 is a side elevational view of another modified form of a combined fitting and carrier plate.

Fig. 21 shows another modification of our novel combined fitting and carrier plate. Fig. 21 shows a fitting 170 with a longitudinally extending tubular member 171 with a bell end 171a and a spigot end 171b for connecttion to conventional piping. The member 171 has a laterally extending branch opening 172, the opening 172a being an elongated opening disposed at an angle of forty-five degrees with respect to the axis of the member 171. The face of the branch of the member 171 has slotted portions 173 spaced laterally from and parallel with the elongated opening 172a and it also has slotted portions 174 extending outwardly from and lengthwise of the elongated opening 172a. A face of carrier plate 176 is disposed on the face of the branch 172 of the fitting 170 and it has a central opening 177 for alignment with the elongated opening 172a in the branch of the fitting 170. The carrier plate 176 has circumferentially spaced apertures through which bolts 181 extend, the bolts 181 having heads (not shown) slidable and anchored in the slotted portions 173 and 174, thereby permitting movement of the carrier plate 176 longitudinally of the elongated opening 172a to permit the cylindrical opening 177 in the carrier plate 176 to be moved to various positions with reference to the elongated opening 172a. The carrier plate 176 has threaded bosses 178 for receiving support studs 178a and it also has parallel slots 179 for anchoring support bolts 180 for supporting a water closet. It will be noted that the plate 176 and associated elements may be turned ninety degrees for vertical battery.

Various changes may be made in the specific embodiment of our invention without departing from the spirit thereof or from the scope of the appended claims.

What we claim is:

1. In a water closet bowl support and drain assembly, a carrier plate comprising a body of generally rectangular shape having a central opening, lateral edges, end edges and two faces, said body having on one face four T-shaped slots, said slots extending parallel to said lateral edges, each slot extending from an end edge to a point near the middle of a lateral edge, said four slots being adapted to receive fastening means for positioning a drain member in connection with said central opening in various relative vertical positions, said body having on its other face five T-shaped slots to accommodate both four bolt and three bolt water closet bowls, two of said five slots leading from the middle of opposite lateral edges a short distance toward the center of said body, two of said five slots leading from two end edges of said body a short distance down adjacent lateral edges, and one of said five slots being centered in the same end edge and leading a short distance toward the center of said body, and the surface of said body toward said drain member being flush and smooth for attachment to the discharge opening of such drain member in abutting relationship thereto.

2. In a water closet bowl support and drain assembly, a carrier plate comprising a body of generally rectangular shape having a central opening, lateral edges, end edges and two faces, said body having on one face four T-shaped slots, each slot extending from an end edge along a lateral edge to a point near the middle of the lateral edge, said four slots being for the purpose of positioning a drain member in connection with said central opening in various relative vertical positions, said body having on its other face five T-shaped slots to accommodate both four bolt and three-bolt water closet bowls, two of said five slots leading from the middle of opposite lateral edges a short distance toward the center of said body, two of said five slots leading from an end edge along a lateral edge, and one of said five slots being centered in the same end edge and leading a short distance toward the center of said body, and there being ribs on said body, on the side with said five slots, bordering said central opening, connecting the slots on that side with the rib bordering said central opening and connecting said slots at each side of said body.

3. A water closet bowl support and drain assembly adapted for drainage in a vertical or horizontal direction comprising a combination drain and vent member, and a carrier plate, said combination member having a drain conduit with an egress opening at one end and an ingress opening at the other end, having an enlarged waterway joining said drain conduit from the side and having a vent conduit joining said drain conduit and waterway and disposed at that side of the center line of said drain conduit toward said waterway, said vent conduit being disposed at acute angles to that portion of said drain conduit from the point of joinder with said waterway to said ingress opening, a carrier plate having two long sides and two short ends, and having a central opening, said carrier plate having on its face toward said waterway four T-shaped slots, each slot extending from one corner of said plate along one of said sides to a point near the middle of that side, said carrier plate having on its other face five T-shaped slots to accommodate both four bolt and three bolt water closet bowls, two of said five slots leading from the middle of opposite sides a short distance toward the center of said plate, two of said five slots leading from two corners of said plate bordering one of said ends and extending a short distance down adjacent sides, and one of said five slots being centered in the same end and leading a short distance toward the center of said plate, and said waterway having a plurality of openings around its edge toward said carrier plate, said openings being so formed and paired in and disposed that an opening in each quadrant is operable with the adjacent slots of said carrier plate when said drain conduit runs vertically and an opening in each quadrant is operable with the same slots when said drain conduit runs horizontally.

4. A water closet bowl support and drain assembly adapted for drainage in a vertical or horizontal direction comprising a combination drain and vent member, a carrier plate, a coupling pipe, said combination member having an elongated drain conduit with a bell on one end having an enlarged waterway joining said elongated conduit from the side near said bell, and having a vent conduit joining said elongated conduit and waterway and disposed at that side of the center line of said elongated conduit toward said waterway, said vent conduit being disposed at acute angles to that portion of said elongated conduit from the point of joinder with said waterway to said bell, a carrier plate of generally rectangular shape having a threaded circular opening centered therein, said carrier plate having on its face toward said waterway four T-shaped slots, each slot extending from one corner of said plate along one side to a point near the middle of that side, said carrier plate having on its face toward said coupling pipe five T-shaped slots to accommodate both four and three bolt water closet bowls, two of said five slots leading from the middle of opposite sides a short distance toward the center of said plate, two of said five slots leading from two corners of said plate bordering one end and extending a short distance along the sides joining said end, and one of said five slots being centered in the same end and leading a short distance toward the center of said plate, the surface of said plate abutting said waterway being flush and smooth, said waterway having an external flange on its end toward said carrier plate, said external flange having eight openings, said openings being paired in the quadrants of said flange and being disposed so that one opening in each quadrant is operable with the adjacent slots of said carrier plate when said elongated conduit runs vertically and the other opening in each quadrant is operable with the same slots when said elongated conduit runs horizontally, a gasket bordering the inner edge of said waterway adjacent said carrier plate, said coupling pipe having external threads to be positioned in said central opening, and bolts for connecting a water closet bowl to said slots on the coupling side of said carrier plate and bolts for connecting said slots on the waterway side of said carrier plate with said flange.

5. A wall closet fitting and carrier, the wall closet fitting being adapted for disposition in a horizontal or a vertical position, comprising a tubular drain fitting having an enlarged, laterally extending branch conduit having an enlarged substantially circular aperture therein, an outwardly directed flange on said branch conduit having circumferentially spaced apertures, a carrier plate having a central opening for alignment with the opening in said branch conduit and having slots running lengthwise of said plate and parallel to each other and on opposite sides thereof, bolt and nut assemblies disposed in said slots in predetermined apertures in said flange in said fitting for disposing said carrier plate longitudinally or transversely of the elongated tubular portion of said fitting, and means on one side of said carrier plate for attaching supporting bolts in triangular outline or four supporting bolts in rectangular outline for supporting water closets having three or four openings for receiving supporting bolts.

6. A wall closet fitting and carrier comprising a tubular fitting having an enlarged, laterally extending branch with an outwardly directed apertured flange, a face plate on said flange, means for securing said face plate for adjustment longitudinally and transversely of the axis of said tubular fitting, said face plate having a central aperture for alignment with said branch, a bolt receiving member on each side of said central aperture and three equally spaced bolt receiving members on one end of said face plate whereby a bolt disposed in said intermediate bolt receiving member defines a three bolt support for a water closet and bolts disposed in said outer bolt receiving members define a four bolt support for a water closet.

7. A wall closet fitting and carrier as set forth in claim 6 wherein a threaded coupling threadably engages the threaded central aperture in said plate, said coupling comprising two externally threaded pipes, the larger pipe being internally threaded for threadably engaging the smaller pipe, and a gasket and a lock nut threadably engaging said smaller pipe and forced against the end of said larger pipe for sealing same.

References Cited in the file of this patent

UNITED STATES PATENTS

| | | |
|---|---|---|
| 1,130,046 | Watrous | Mar. 2, 1915 |
| 1,389,608 | Trueman | Sept. 6, 1921 |
| 1,410,526 | Bennett | Mar. 21, 1922 |
| 1,471,154 | Graham | Oct. 16, 1923 |
| 1,473,439 | Marsh | Nov. 6, 1923 |
| 1,497,171 | Haas | June 10, 1924 |
| 1,650,057 | Wernle | Nov. 22, 1927 |
| 1,706,285 | Frye | Mar. 19, 1929 |
| 1,759,321 | Oldfield | May 20, 1930 |
| 1,928,628 | McDermott | Oct. 3, 1933 |
| 1,970,707 | Riddell | Aug. 21, 1934 |
| 2,295,416 | Madison | Sept. 8, 1942 |